US007925749B1

(12) United States Patent
Lin et al.

(10) Patent No.: US 7,925,749 B1
(45) Date of Patent: Apr. 12, 2011

(54) SYSTEM AND METHOD FOR TRANSPARENT DATA REPLICATION OVER MIGRATING VIRTUAL SERVERS

(75) Inventors: Dong Lin, Sunnyvale, CA (US); Ravikanth Dronamraju, Sunnyvale, CA (US); Mark Muhlstein, Sunnyvale, CA (US); Michael L. Federwisch, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 649 days.

(21) Appl. No.: 11/739,239

(22) Filed: Apr. 24, 2007

(51) Int. Cl.
*G06F 15/167* (2006.01)
*G06F 12/00* (2006.01)
(52) U.S. Cl. ......... 709/225; 709/215; 711/147; 711/148
(58) Field of Classification Search .................. 709/225, 709/203, 215; 707/203, 202; 714/4; 711/147, 711/148
See application file for complete search history.

(56) References Cited

U.S. PATENT DOCUMENTS

| | | | | |
|---|---|---|---|---|
| 4,714,996 | A * | 12/1987 | Gladney et al. ........................ | 1/1 |
| 5,613,079 | A * | 3/1997 | Debique et al. ............... | 711/141 |
| 5,978,577 | A * | 11/1999 | Rierden et al. .......................... | 1/1 |
| 6,574,591 | B1 | 6/2003 | Kleiman et al. | |
| 6,604,118 | B2 | 8/2003 | Kleiman et al. | |
| 6,668,264 | B1 | 12/2003 | Patterson et al. | |
| 6,889,228 | B1 * | 5/2005 | Federwisch ............................ | 1/1 |
| 6,895,429 | B2 | 5/2005 | Banga et al. | |
| 6,915,316 | B1 | 7/2005 | Patterson et al. | |
| 6,993,539 | B2 * | 1/2006 | Federwisch et al. ................... | 1/1 |
| 7,007,046 | B2 | 2/2006 | Manley et al. | |
| 7,010,553 | B2 | 3/2006 | Chen et al. | |
| 7,024,427 | B2 * | 4/2006 | Bobbitt et al. ................. | 707/200 |
| 7,039,663 | B1 * | 5/2006 | Federwisch et al. ................... | 1/1 |
| 7,043,485 | B2 | 5/2006 | Manley et al. | |
| 7,143,307 | B1 * | 11/2006 | Witte et al. ......................... | 714/6 |
| 7,191,298 | B2 * | 3/2007 | Kaminsky et al. ............. | 711/162 |
| 7,194,519 | B1 * | 3/2007 | Muhlestein et al. ........... | 709/215 |
| 7,203,796 | B1 * | 4/2007 | Muppalaneni et al. ........ | 711/114 |
| 7,225,204 | B2 | 5/2007 | Manley et al. | |
| 7,325,109 | B1 * | 1/2008 | Muppalaneni et al. ........ | 711/162 |
| 7,360,034 | B1 | 4/2008 | Muhlestein et al. | |
| 7,383,463 | B2 * | 6/2008 | Hayden et al. ...................... | 714/4 |
| 7,415,467 | B2 * | 8/2008 | Jeevanjee et al. ...................... | 1/1 |
| 7,461,289 | B2 * | 12/2008 | VanRiper et al. .................. | 714/4 |
| 7,523,286 | B2 * | 4/2009 | Ramany et al. ................ | 711/170 |
| 7,571,215 | B2 * | 8/2009 | Jacobs et al. ................... | 709/208 |
| 7,603,391 | B1 * | 10/2009 | Federwisch et al. ........... | 707/203 |
| 7,617,365 | B2 * | 11/2009 | Zhang et al. ................... | 711/141 |
| 7,631,021 | B2 * | 12/2009 | Sarma et al. ........................... | 1/1 |
| 7,697,554 | B1 * | 4/2010 | Ofer et al. ...................... | 370/412 |
| 7,702,791 | B2 * | 4/2010 | Halpern et al. ................ | 709/227 |
| 7,769,717 | B2 * | 8/2010 | Federwisch et al. ........... | 707/649 |
| 7,814,499 | B2 * | 10/2010 | Straube et al. ................. | 719/313 |

(Continued)

*Primary Examiner* — Krisna Lim
(74) *Attorney, Agent, or Firm* — Cesari and McKenna, LLP

(57) ABSTRACT

A system and method for transparent data replication of one or more data containers over migrating virtual servers (vfilers) operating on physical storage systems is provided. A mirroring (or other replication) procedure associated with a vfiler generates an entry in a mirror table maintained by one or more appropriate mirroring applications executing on the physical storage systems. The mirror table identifies source and destination "owners" of a replicated data container by vfiler instead of only by physical storage system. Thus, when a vfiler is migrated from a source physical storage system ("source") to a destination physical storage system ("destination"), the mirroring application may continue to perform mirroring operations on the data containers at a per vfiler level to thereby improve the utility of migration of the vfiler among the storage systems.

40 Claims, 6 Drawing Sheets

U.S. PATENT DOCUMENTS

| | | |
|---|---|---|
| 2003/0084104 A1* | 5/2003 | Salem et al. .................. 709/205 |
| 2003/0105810 A1* | 6/2003 | McCrory et al. .............. 709/203 |
| 2005/0138312 A1* | 6/2005 | Kubo et al. ................... 711/162 |
| 2006/0161746 A1* | 7/2006 | Wong et al. ................... 711/162 |
| 2006/0184587 A1 | 8/2006 | Federwisch et al. |
| 2006/0218210 A1 | 9/2006 | Sarma et al. |
| 2007/0038887 A1* | 2/2007 | Witte et al. ....................... 714/6 |
| 2007/0283186 A1* | 12/2007 | Madnani et al. ................. 714/6 |
| 2009/0006792 A1 | 1/2009 | Federwisch et al. |
| 2009/0030983 A1 | 1/2009 | Malaiyandi et al. |

* cited by examiner

SYSTEM AND METHOD FOR TRANSPARENT DATA REPLICATION OVER MIGRATING VIRTUAL SERVERS

FIELD OF THE INVENTION

The present invention relates to data replication and restoration and, more specifically, to a technique for efficiently replicating and restoring data over migrating virtual servers.

BACKGROUND OF THE INVENTION

A file server is a computer that provides file service relating to the organization of information on persistent storage devices, such as memories, tapes or disks. The file server may be embodied as a storage system including a storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

One type of file system is a write-anywhere file system that does not overwrite data on disks. If a data block on disk is retrieved (read) from disk into memory and modified with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif. The WAFL file system is implemented as a microkernel within an overall protocol stack of the filer and associated disk storage. The disk storage is typically implemented as one or more storage "volumes" that comprise a cluster of physical storage devices (disks), defining an overall logical arrangement of disk space.

Certain storage systems provide the ability to create and maintain, with substantial flexibility and fine granularity, multiple instances of virtual servers, (vfilers), within a server, such as a storage system platform. A vfiler is a logical partitioning of network and storage resources of the storage system to establish an instance of a multi-protocol server. Each vfiler is maintained and executed independent of other vfilers on the platform. Storage system resources, such as units of storage and network addresses of network interfaces, may be grouped, partitioned and allocated to the vfilers to establish security domains within the storage system. Each of these per-vfiler security domains is termed a vfiler context. Operations performed within a particular vfiler context may not access resources allocated to other vfilers. However, common storage system resources, such as a storage operating system and a file system, may be shared among the vfilers.

A noted disadvantage arises when utilizing vfilers in environments that utilize mirroring and/or other data backup techniques. Using known data mirroring techniques, mirrors are created and established by a mirroring application at the level of a physical storage system and not at the level of individual vfilers. Thus, should a vfiler be migrated from one physical storage system to another due to, e.g., load-balancing operations, etc., the mirroring relationship may be broken as the mirroring application will continue to be associated with the physical storage system originally hosting the vfiler and not the physical storage subsystem hosting the migrated vfiler. Vfiler migration is described in U.S. patent application Ser. No. 10/098,814, entitled REMOTE DISASTER RECOVERY AND DATA MIGRATION USING VIRTUAL APPLIANCE MIGRATION, by Wesley R. Witte, et al., now issued as U.S. Pat. No. 7,143,307 on Nov. 28, 2006, the contents of which are hereby incorporated by reference.

As a result, administrators may be limited when utilizing vfiler migration techniques while at the same time maintaining an acceptable level of data redundancy and backup operations using, e.g., mirroring techniques. Similarly, should an error condition result in data corruption, an administrator may be limited to performing a complete restoration of all data associated with a physical storage system and may not have the opportunity to individually select only a single vfiler to restore. The disadvantages limit the usefulness of vfilers in certain contexts, thereby reducing one of vfilers' functionality in such storage system environments.

SUMMARY OF THE INVENTION

The present invention overcomes the disadvantages of the prior art by providing a system and method for transparent data replication of one or more data containers over migrating virtual servers (vfilers) operating on physical storage systems. A mirroring (or other replication) procedure associated with a vfiler generates an entry in a mirror table maintained by one or more appropriate mirroring applications executing on the physical storage systems. The mirror table identifies source and destination "owners" of a replicated data container by vfiler instead of only by physical storage system. Thus, when a vfiler is migrated from a source physical storage system ("source") to a destination physical storage system ("destination"), the mirroring application may continue to perform mirroring operations on the data containers at a per vfiler level to thereby improve the utility of migration of the vfiler among the storage systems.

In operation, when a mirroring relationship is established on a vfiler, an entry in the mirror table is created for the mirroring relationship identifying the source and destinations of the relationship on a per vfiler basis. When the mirroring application performs an update procedure, i.e., sends modified data of a data container from the source to the destination, worker threads of the mirroring application examine the mirror table to determine an appropriate vfiler context to invoke when performing the mirroring operations. For example, a worker thread on the source invokes the appropriate vfiler context for the source vfiler in order to read and send the modified data to the destination. Similarly, a worker thread on the destination invokes the appropriate vfiler context (from the mirror table) for the destination vfiler in order to receive and write the modified data to, e.g., disk 130. By tracking mirroring relationships on a per vfiler basis, information relating to mirroring operations may be displayed to an administrator on a vfiler and/or physical storage system basis, thereby improving the reporting ability of a storage system.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
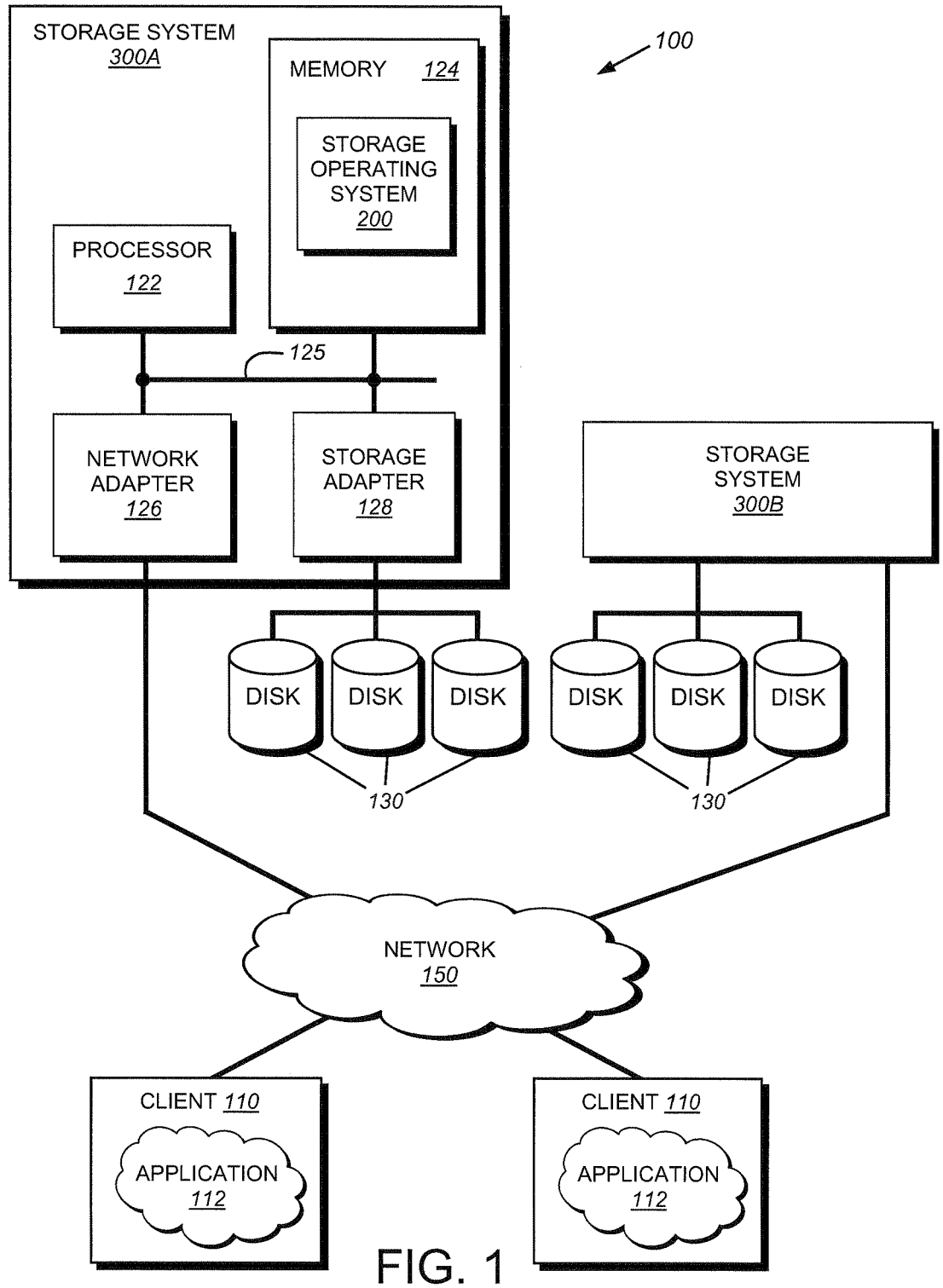
FIG. 1 is a schematic block diagram of a computer network including a plurality of storage systems that may be advantageously used with the present invention.

FIG. 1 is a schematic block diagram of a network environment 100 including a plurality of physical storage systems 200A, B which may be advantageously used with the present invention. Each storage system 200 is a computer that provides data access service relating to the organization of information on storage devices, such as disks 130. Each storage system 200 may be embodied as a filer and comprises a processor 122, a memory 124, a network adapter 126 and a storage adapter 128 interconnected by a system bus 125. Each storage system 200 also includes a storage operating system 300 that implements a file system to logically organize the information as a hierarchical structure of directories and files on the disks.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the storage system by, inter alia, invoking storage operations in support of storage services implemented by the storage system. It will be apparent to those is skilled in the art that other processing and memory means, including various computer readable media, may be used for storing and executing program instructions pertaining to the inventive technique described herein.

The network adapter 126 may comprise a network interface card (NIC) having the mechanical, electrical and signaling circuitry needed to connect the storage system 200 to one or more clients 110 over a computer network 150. Each client 110 may be a general-purpose computer configured to execute applications 112. Moreover, each client 110 may interact with the storage system 200 in accordance with a client/server model of information delivery. That is, the client may request the services of the storage system, and the storage system may return the results of the services requested by the client, by exchanging packets encapsulating, e.g., the Common Internet File System (CIFS) protocol or Network File System (NFS) protocol format over the network 150.

The storage adapter 128 cooperates with the storage operating system 300 executing on the storage system to access information requested by the client. The information may be stored on the disks 130 or other similar media adapted to store information. The storage adapter includes input/output (I/O) interface circuitry that couples to the disks over an I/O interconnect arrangement, such as a conventional high-performance, Fibre Channel serial link topology. The storage adapter retrieves the information that, if necessary, is processed by the processor 122 (or the adapter 128 itself) prior to being forwarded over the system bus 125 to the network adapter 126, where the information is formatted into a packet and returned to the client 110.

Storage of information on the storage system is preferably implemented as one or more storage "volumes" that comprise a cluster of physical storage disks 130, defining an overall logical arrangement of disk space. Each volume is generally associated with its own file system. To facilitate access to the disks 130, the storage operating system 300 implements a write-anywhere file system that logically organizes the information as a hierarchical structure of directories and files on the disks. Each "on-disk" file may be implemented as set of disk blocks configured to store information, such as data, whereas the directory may be implemented as a specially formatted file in which names and links to other files and directories are stored.

B. Vfilers

Figure 2:
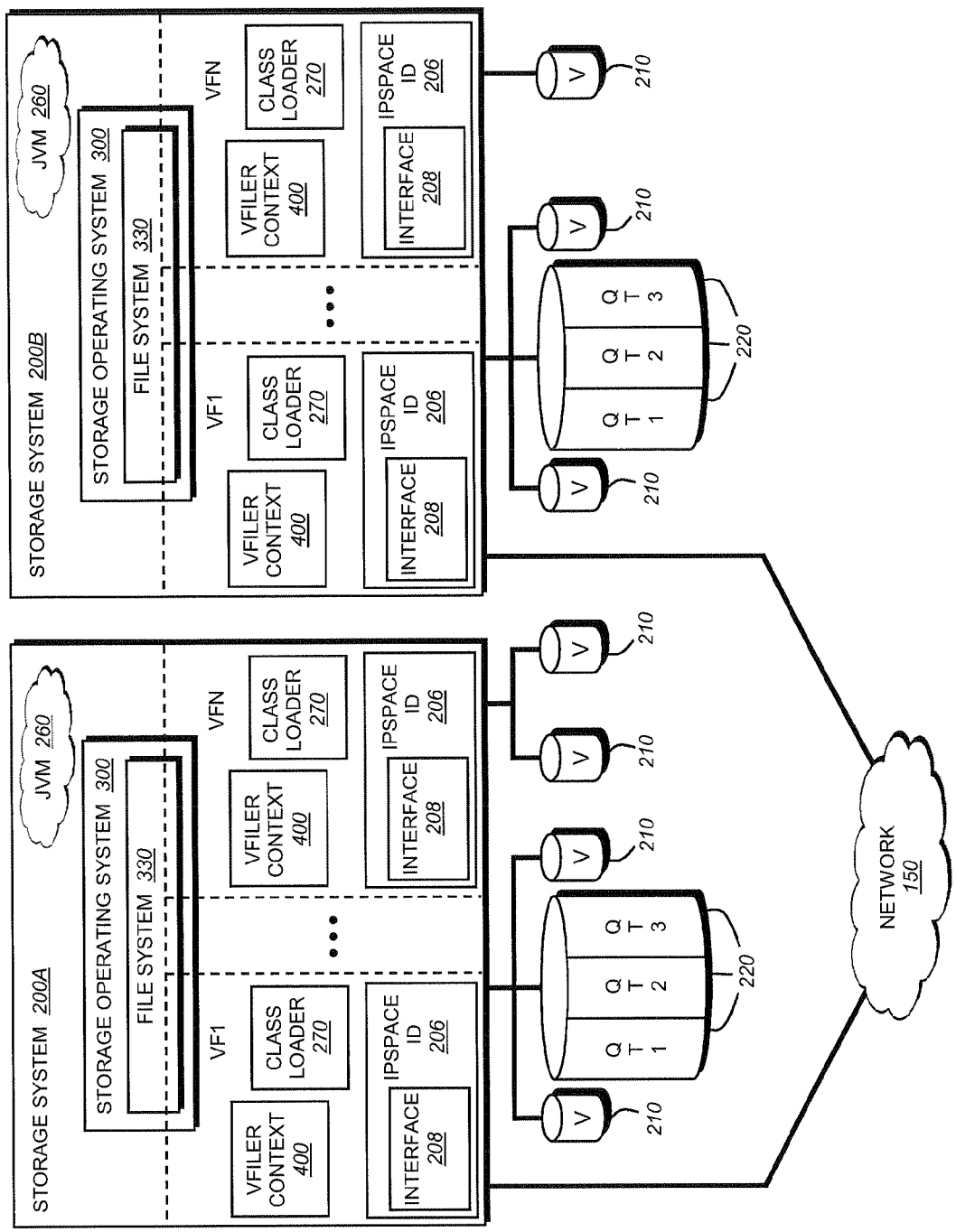
FIG. 2 is a schematic block diagram of a storage operating system that may be advantageously used with the present invention.

FIG. 2 is a schematic diagram of an embodiment of a plurality of physical storage systems 200 that may be advantageously used with the present invention. Each physical storage system or filer is organized into one or more logical virtual filers (vfilers), each of which may be embodied as a server, e.g., a CIFS server, and referenced by a logical name, e.g., VF1-VFN. A vfiler is a logical partitioning of network and storage resources of the storage system to establish an instance of a multi-protocol server. Each vfiler is maintained and executed independent of other vfilers on the platform. Storage system resources, such as units of storage and network addresses of network interfaces, may be grouped, partitioned and allocated to the vfilers to establish security domains within the storage system. Each of these per-vfiler security domains is termed a vfiler context. Operations performed within a particular vfiler context may not access resources allocated to other vfilers. However, common storage system resources, such as a storage operating system and a file system, may be shared among the vfilers. Each vfiler is configured to serve ("host") data, such as a data set, for a user or client.

Each vfiler VF1-VFN is configured with one or more network addresses, such as Internet Protocol (IP) addresses, that may be assigned to one or more network interfaces 208. In this context, the term network interface refers to an IP addressable interface, including a "physical" NIC and a "soft" NIC, such as a virtual interface (VIF), a virtual local area network (VLAN) and an emulated LAN (ELAN). Each network interface is further assigned an IPspace identifier (ID) 206 that essentially "binds" the interface to an IPspace. An IPspace refers to each distinct IP address space in which the filer and its storage operating system participate. Each vfiler is associated with an IP address space and, thus, belongs to one IPspace. The IPspace is further described in U.S. patent application Ser. No. 10/035,666 titled, Technique for Enabling Multiple Virtual Filers on a Single Filer to Participate in Multiple Address Spaces with Overlapping Network Addresses, filed on Dec. 28, 2001, now issued as U.S. Pat. No. 6,895,429 on May 17, 2005 and which is hereby incorporated by reference as though fully set forth herein.

The units of storage resources allocated to each vfiler include a volume or sub-volume (qtree). A volume (V) 210 is a unit of storage comprising a file system or hierarchy of directories and files. A qtree, QT1-3 220, is a special directory similar to a mini-volume (mini-file system) or subdivision of a volume that has the property of being able to identify itself within a file system by, e.g., a qtree identifier (qtreeid) stored within an inode of a file. The vfiler architecture provides efficient utilization and management of these storage resources, including creation, assignment and mapping of the resources to and among the vfilers. For example, a virtual server (such as vfiler) and its associated storage resources (such as qtrees) may be migrated to a server (such as a filer) and consolidated with other virtual servers (vfilers) having similarly named resources. Since the storage resources are allocated on a per-vfiler basis, storage migration is transparent to a client because there is no change in the way the client refers to its data.

In the illustrative embodiment, each physical storage system 200 includes a single Java Virtual Machine (JVM) 260 that is utilized by each vfiler executing on the physical storage system. However, each vfiler may have an individual class loader 270 to enable Java based applications, including, e.g., mirroring application (390 at FIG. 3), to be executed within a particular vfiler context.

Each instance of a vfiler is described by "external" and "internal" configuration. External configuration describes the resources assigned to a vfiler (e.g., one or more IP addresses and one or more units of storage, such as an entire volume or a qtree on a volume) and capabilities available to a vfiler (e.g., protocols allowed to run on the vfiler). Internal configuration (i.e., internal to the vfiler) controls operation of various protocol modules or "vfiler options" associated with the vfiler. Examples of such options include whether a network information system (NIS) server is to be used with the vfiler and whether a particular protocol, such as NFS, uses TCP or UDP as its underlying transport.

C. Storage Operating System

As noted, to facilitate access to the disks 130, the storage operating system 200 illustratively implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is illustratively the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 3:
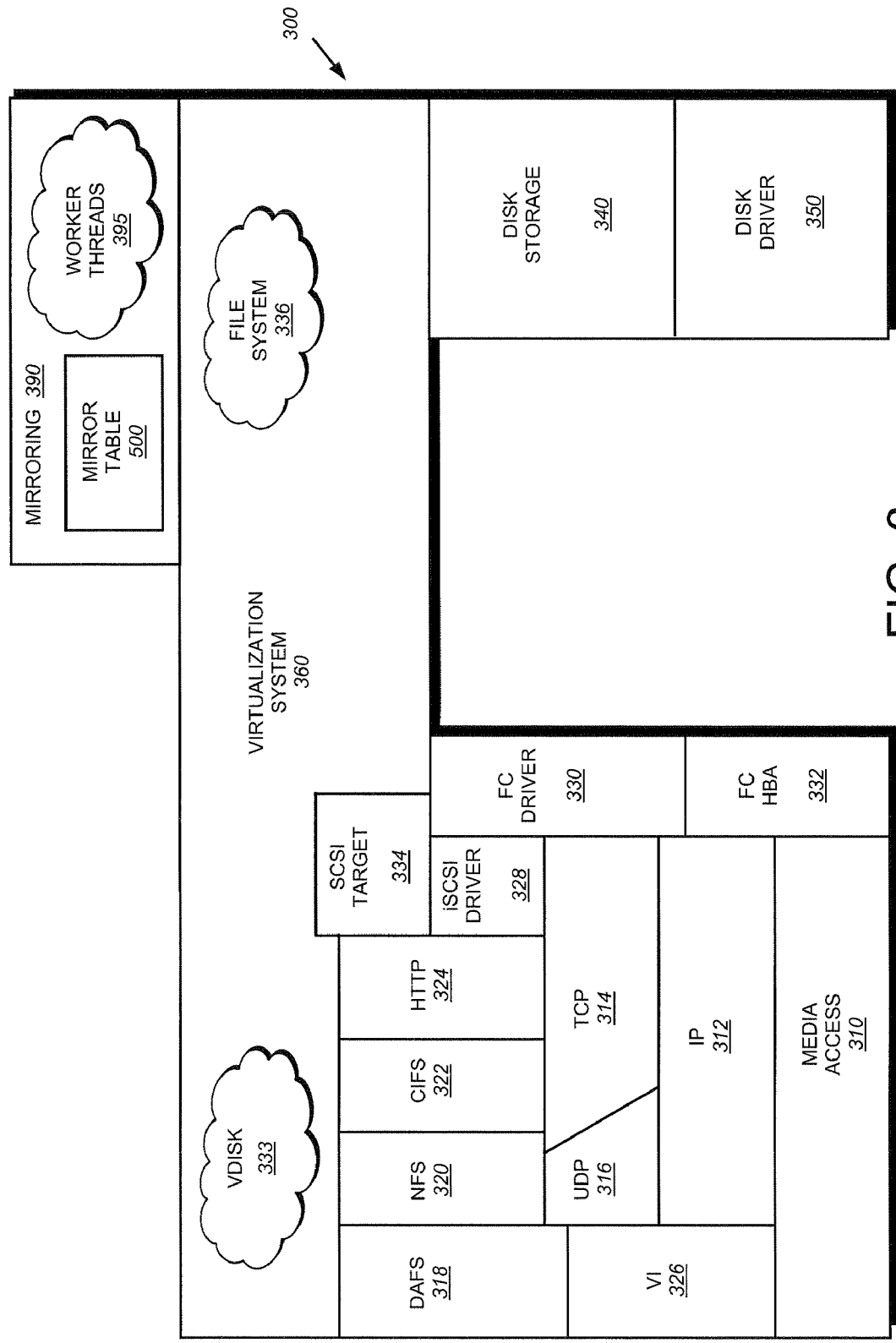
FIG. 3 is a schematic diagram of an embodiment of a storage system platform having a plurality of virtual storage systems (vfilers) that may be advantageously used with is the present invention.

FIG. 3 is a schematic block diagram of an exemplary storage operating system 300 that may be advantageously used with the present invention. The storage operating system comprises a series of software modules organized to form an integrated network protocol stack or, more generally, a multi-protocol engine that provides data paths for clients to access information stored on the storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318 the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol.

An iSCSI driver layer 328 provides block protocol access over the TCP/IP network protocol layers, while a FC driver layer 330 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a disk storage module 340 embodied as a RAID system that manages the storage and retrieval of information to and from the volumes/disks in accordance with I/O operations, and a disk driver system 350 that implements a disk access protocol such as, e.g., the SCSI protocol.

Bridging the disk software layers with the integrated network protocol stack layers is a virtualization system 360 that is implemented by a file system 336 interacting with virtualization modules illustratively embodied as, e.g., vdisk module 333 and SCSI target module 334. The vdisk module 333 is layered on the file system to enable access by administrative interfaces, such as a user interface, in response to a user (system administrator) issuing commands to the storage system. The SCSI target module 334 is disposed between the FC and iSCSI drivers and the file system to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system provides functions normally associated with a volume manager. These functions include (i) aggregation of the disks, (ii) aggregation of storage bandwidth of the disks, and (iii) reliability guarantees, such as mirroring and/or parity (RAID). The file system illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client is forwarded as a packet over the computer network 150 and onto the filer 200 where it is received at the network adapter. A network driver (of layer 310 or layer 332) processes the packet and, if appropriate, passes it on to a network protocol and file access layer for additional processing prior to forwarding to the write-anywhere file system 336. Here, the file system generates operations to load (retrieve) the requested data from disk if it is not resident "in core," i.e., in memory 124. If the information is not in the memory, the file system indexes into the inode file using the inode number to access an appropriate entry and retrieve a logical vbn. The file system then passes a message structure including the logical vbn to the RAID system 340; the logical vbn is mapped to a disk identifier and disk block number (disk,dbn) and sent to an appropriate driver (e.g., SCSI) of the disk driver system 350. The disk driver accesses the dbn from the specified disk and loads the requested data block(s) in memory 124 for processing by the filer. Upon completion of the request, the filer (and operating system) returns a reply to the client over the network 150.

It should be noted that the software "path" through the storage operating system layers described above needed to perform data storage access for the client request received at the filer may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by filer in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage services provided by the system. It is expressly contemplated that the various processes, architectures and procedures described herein can be implemented in hardware, firmware or software.

As used herein, the term "storage operating system" generally refers to the computer-executable code operable to perform a storage function in a filer, e.g., that manages data access and may, in the case of a file server, implement file system semantics. In this sense, the Data ONTAP® software is an example of such a storage operating system implemented as a microkernel and including a file system 336 to implement the WAFL® file system semantics and manage data access. The storage operating system can also be implemented as an application program operating over a general-purpose operating system, such as UNIX® or Windows XP®, or as a general-purpose operating system with configurable functionality, which is configured for storage applications as described herein.

A mirroring application module 390 executing the storage operating system 300 illustratively generates appropriate mirrors (replicas) of data sets and manages data backups in accordance with an illustrative embodiment of the present invention. One exemplary mirroring technique is described in U.S. patent application Ser. No. 10/100,967, entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., now issued as U.S. Pat. No. 6,993,539 on Jan. 31, 2006, the contents of which are hereby incorporated by reference. The mirroring application module 390 maintains an exemplary mirror table 500, described further below in reference to FIG. 5. As described herein, the mirror table 500 illustratively tracks the location and owners of data containers that are mirrored within a storage system environment to enable mirroring relationships to be maintained after a vfiler has been migrated from one physical storage system to a second physical storage system in accordance with an embodiment of the present invention. It should be noted that mirroring is utilized as an illustrative embodiment and that any data replication technique may be utilized in accordance with the present invention.

The mirroring application module 390 illustratively includes a plurality of worker threads 395 adapted to perform various mirroring activities. For example, when processing a mirroring operation, the worker thread illustratively determines an appropriate vfiler context to invoke by examining one or more appropriate entries from the mirror table 500. The entries indicate, among other things, the vfiler context which "owns" a data container being mirrored as well as a security domain of that context. Thus, by invoking the appropriate vfiler context, the worker thread 395 ensures security across a plurality of vfilers executing on a single physical storage system. Examples of techniques for duplicating all or part of a file system that may be advantageously used with the invention are described in U.S. patent application Ser. Nos. 09/127,497 titled File System Image Transfer, by Kleiman et al, filed Jul. 31, 1998. now issued as U.S. Pat. No. 6,604,118 on Aug. 5, 2003, and Ser. No. 09/426,409 titled File System Image Transfer Between Dissimilar File Systems, by Kleiman et al., filed Oct. 25, 1999, now issued as U.S. Pat. No. 6,574,591 on Jun. 3, 2003, which applications are hereby incorporated by reference as though fully set forth herein. The mirroring application module is an exemplary data replication process; however, it should be noted that in alternate embodiments of the present invention, other forms of data replication processes may be utilized.

Figure 4:
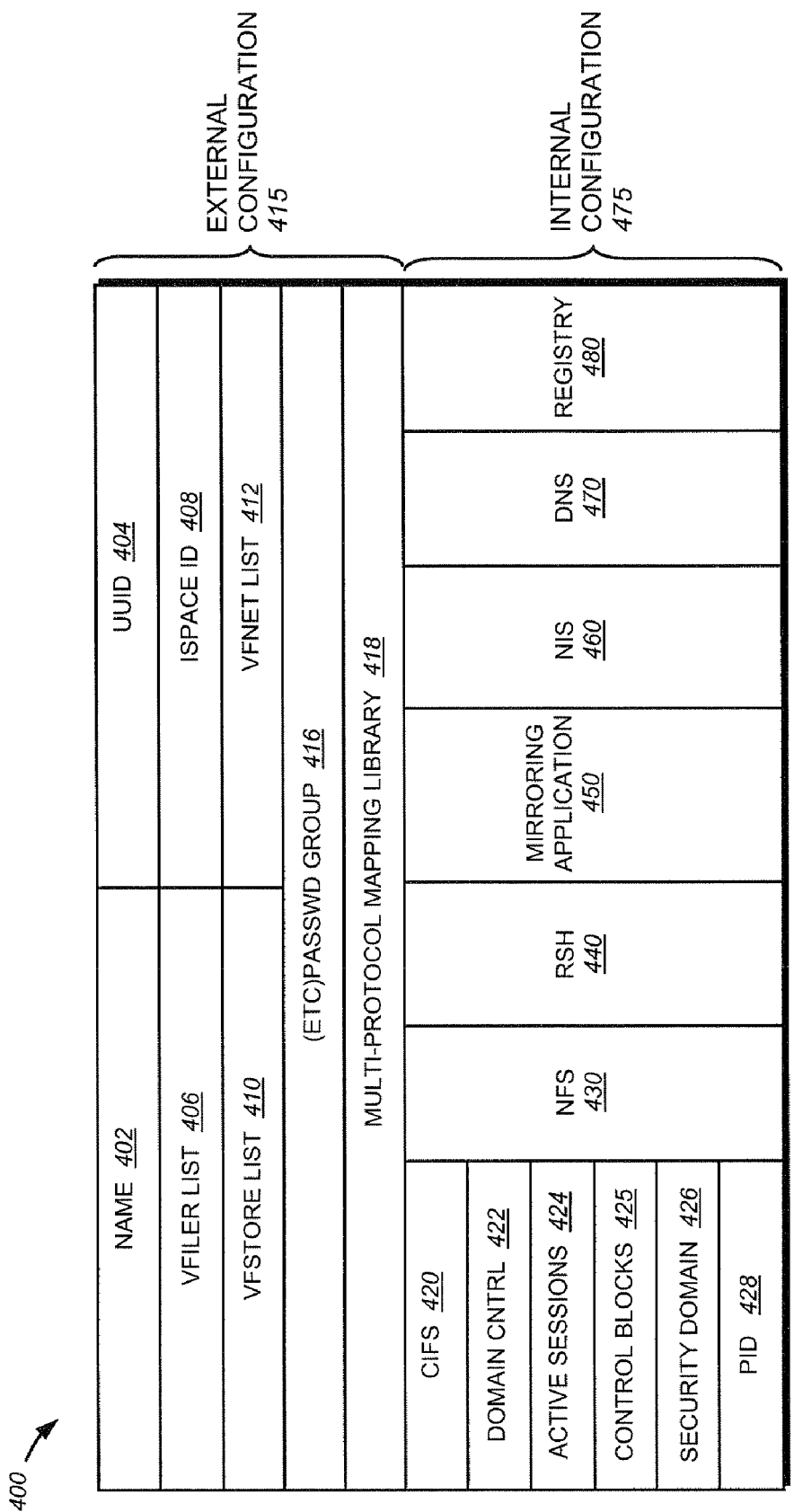
FIG. 4 is a schematic block diagram illustrating a vfiler context data structure that may be advantageously used with the present invention.

FIG. 4 is a schematic block diagram illustrating an in core representation of a vfiler context 400 containing external configuration 415 and internal configuration 475 or "state" needed to establish an instance of a multi-protocol server. The vfiler context 400 includes fields for holding a name 402 of the vfiler and a universally unique identifier (UUID 404) that is created with the vfiler context. A vfiler list field 406 contains a list of vfilers on the physical storage system platform and an IPspace indicator (ID) field 408 holds the IPspace ID of the vfiler. Other fields hold a list 410 of vfiler storage (vfstore) structures (soft objects) and a list 412 of vfiler network (vfnet) soft objects.

Specifically, the vfstore list 410 comprises pointers to vfstore soft objects, each of which has a pointer that references a path to a unit of storage resource, such as a qtree or volume, allocated to the vfiler. The vfnet list 412 comprises pointers to vfnet soft objects, each of which has a pointer that references an interface address data structure representing an IP address assigned to the vfiler. Each vfnet object represents a "floating" capability that may be assigned to any network interface, e.g., a NIC, when an IP address is assigned to that NIC. If multiple IP addresses are assigned to the NIC, the capabilities of the NIC are effectively shared between multiple vfnet objects and, thus, potentially different vfilers. If only a single IP address is associated with an interface, only one vfnet object, and therefore only one vfiler, uses the capabilities of the NIC. The vfstore and vfnet objects are further described in U.S. patent application Ser. No. 10/035,664 titled, Architecture for Creating and Maintaining Virtual Filers on a Filer, filed on Dec. 28, 2001, now issued as U.S. Pat. No. 7,360,034 on Apr. 15, 2008, which is hereby incorporated by reference as though fully set forth herein.

Each vfiler context 400 further includes information pertaining to the security domain of the vfiler to thereby enable controlled access to allocated and shared resources of the vfiler. In particular, each vfiler context has a pointer to /etc/passwd,group files 416 containing a user ID and group ID associated with each user password. The vfiler context structure 400 also implements a multi-protocol feature that supports multiple different clients having different types of security, and the ability to map those different client security types to different vfilers of a filer. The vfiler context implements this feature by providing a pointer that references a multi-protocol mapping library file 418 that enables translation of permission checking attributes from one protocol to another (e.g., NFS to NT security).

Each vfiler context 400 includes a plurality of "module" data structures that includes all information (such as global variables) needed for an instance of a particular protocol or subsystem. For example, a CIFS module data structure 420 contains all information needed for an instance of the CIFS protocol, including information about contacting a domain controller 422, active sessions 424 for the protocol and various control blocks 425 associated with the CIFS protocol. Information pertaining to a security domain 426 is also provided to enable NT-type security for a CIFS request. The security information includes a security identifier comprising a domain portion and a relative ID (RID) portion, the latter RID being similar to the user ID of UNIX security. Each CIFS module 420 also contains a process ID (PID 428) of the CIFS authentication process that enables the CIFS layer to send an authentication request to the correct CIFS authentication process.

There is a similar "per-module" data structure for each of the protocols and subsystems associated with a vfiler including, but not limited to, the NFS protocol 430, Remote SHell (RSH) protocol 440, mirroring applications 450, NIS subsystem 460, domain name service (DNS) subsystem 470 and registry 480. The NIS subsystem or "yellow pages" is a service locator for the NFS protocol that is implemented as a distributed database storing security information, such as user and group IDs associated with each user password. The NIS subsystem module 460 includes information for contacting a NIS controller when access to the distributed security database is required (using, e.g., the /etc/passwd,group information stored in file 416). The DNS subsystem facilitates resolution of a DNS name to a corresponding IP address.

The registry is a repository for configuration information pertaining to the hardware, software and users of the filer (and each vfiler). Each vfiler has its own per-vfiler registry, which is the only registry space "visible" when running in a per-vfiler context. All per-vfiler options and certain configuration data are stored in this per-vfiler registry. Other per-vfiler configuration information is stored in the /etc store associated with each vfiler. For example, configuration information that a vfiler administrator may need to access (such as a passwd file) is stored in the /etc directory off the root of the vfiler's volume.

The external configuration information 415 used to describe an instance of a vfiler is preferably stored "on-disk" in the global registry of the physical storage system (which is typically stored on the root volume of the storage system), whereas the internal configuration 475 is stored in a private registry in the storage assigned to the vfiler.

D. Transparent Migration of Vfilers

The present invention provides a system and method for transparent data replication of one or more data containers over migrating virtual servers (vfilers) operating on physical storage systems. A mirroring (or other replication) procedure associated with a vfiler generates an entry in a mirror table maintained by one or more appropriate mirroring applications executing on the physical storage systems. The mirror table identifies source and destination "owners" of a replicated data container by vfiler instead of only by physical storage system. Thus, when a vfiler is migrated from a source physical storage system ("source") to a destination physical storage system ("destination"), the mirroring application may continue to perform mirroring operations on the data containers at a per vfiler level to thereby improve the utility of migration of the vfiler among the storage systems.

In operation, when a mirroring relationship is established on a vfiler, an entry in the mirror table is created for the mirroring relationship identifying the source and destinations of the relationship on a per vfiler basis. When the mirroring application performs an update procedure, i.e., sends modified data of a data container from the source to the destination, worker threads of the mirroring application examine the mirror table to determine an appropriate vfiler context to invoke when performing the mirroring operations. For example, a worker thread on the source invokes the appropriate vfiler context for the source vfiler in order to read and send the modified data to the destination. Similarly, a worker thread on the destination invokes the appropriate vfiler context (from the mirror table) for the destination vfiler in order to receive and write the modified data to, e.g., disk 130. By tracking mirroring relationships on a per vfiler basis, information relating to mirroring operations may be displayed to an administrator on a vfiler and/or physical storage system basis, thereby improving the reporting ability of a storage system.

Figure 5:
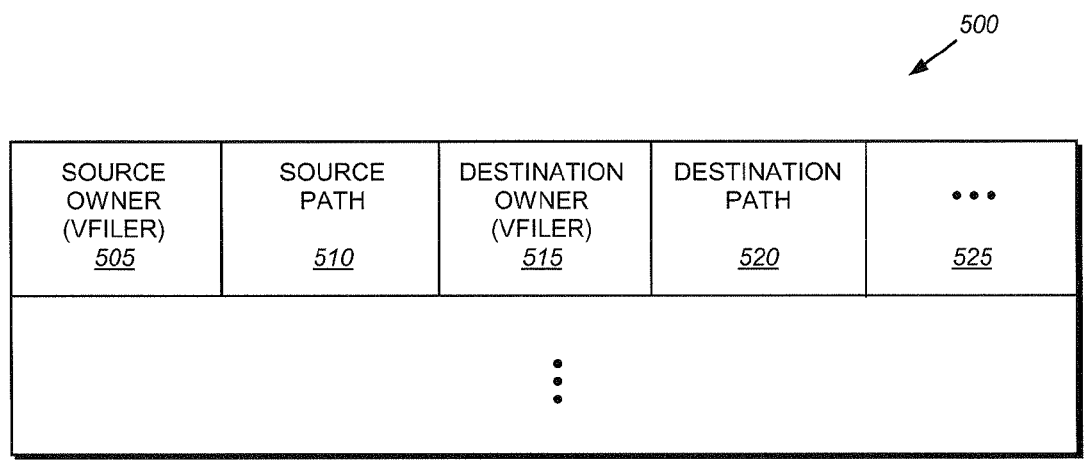
FIG. 5 is a schematic block diagram of an exemplary mirror table in accordance with an illustrative embodiment of the present invention.

FIG. 5 is an exemplary mirror table 500 in accordance with an embodiment of the present invention. The mirror table 500 includes a plurality of entries, i.e., one entry per data replication relationship between vfilers. Each entry includes a source owner field 505, a source path field 510, a destination owner field 515, a destination path field 520 and, in alternate embodiments, additional fields 525. The source owner field 505 identifies the vfiler that owns the source data container in the replication relationship. The source vfiler is typically represented by a vfiler ID, but may be identified using other techniques, including, e.g., a name. The source path field 510 identifies a path for accessing the data container that is being replicated. Typically this source path is set based on the source vfiler as the root of the path; however, in alternate embodiments, other roots may be utilized. The destination owner field 515 identifies the vfiler that owns the data container serving as the destination for the replication. Similarly, the destination path field 520 identifies a path for storing the destination data container on, e.g., disk 150 of the destination. In accordance with the illustrative embodiment of the present invention, whenever a replication relationship is created/modified/destroyed the appropriate mirror table entry 500 is created/modified/destroyed. Similarly, should a vfiler migrate from one physical storage system to another, the mirror table on the new physical storage system servicing the vfiler is updated to reflect that a vfiler executing on the physical storage system is in a replication relationship.

Figure 6:
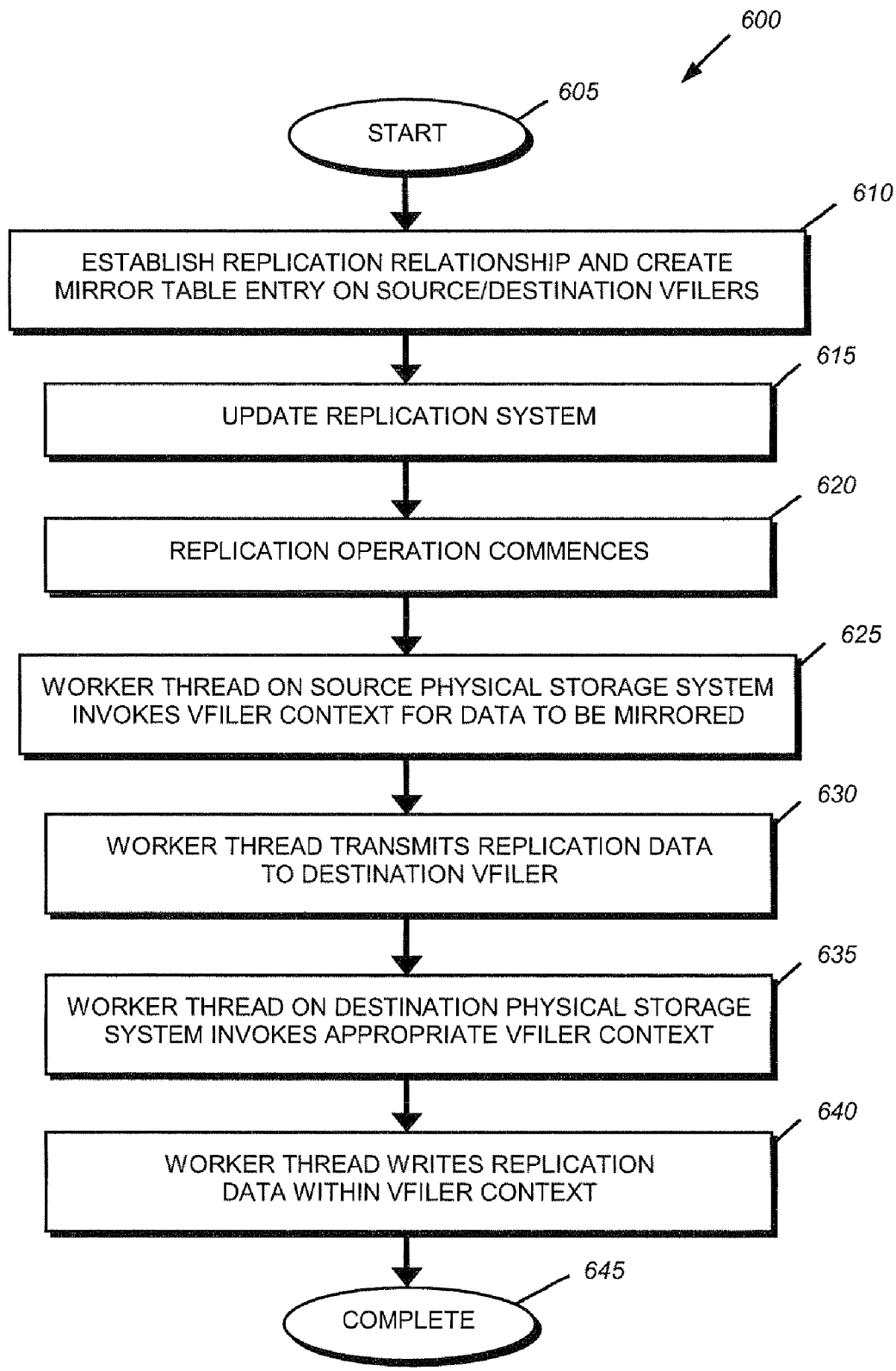
FIG. 6 is a flowchart detailing the steps of a procedure for performing mirroring operations among migrating vfilers in accordance with an embodiment of the present invention.

FIG. 6 is a flow chart illustrating the steps of a procedure 600 for enabling the transparent data replication of one or more data containers over migrating vfilers in accordance with an embodiment of the present invention. The procedure 600 begins in step 605 and continues to step 610 where a data replication relationship, e.g., a mirroring relationship, is established. Such a replication relationship may be established using conventional mirroring applications. Also during step 610 an appropriate mirror table 500 entry is created on both the source and destination systems that identifies the source and destination vfilers of the replication relationship. At some later point in time an update occurs to the replicated data container in step 615. This may occur by, for example, new (i.e., modified) data being written to a source volume (or other data container) within the replicated relationship. In response to the update to the replicated data, the mirroring application commences a replication operation in step 620. This may occur by the mirroring application allocating one or more worker threads to identify the modified data and to transmit the modified data on the source to the destination.

In step 625 a worker thread on the source of enters the source vfiler context for the data to be mirrored. The worker thread may identify the appropriate vfiler context by, e.g., examining an entry within the mirror table 500 to identify the source vfiler. By identifying the source vfiler, the worker thread may then invoke the appropriate vfiler context in distinction to the prior art where replication occurred only on a per physical storage system basis. The worker thread then transmits the replication data to the destination vfiler in step 630 using conventional replication techniques such as that described above in U.S. Pat. No. 6,993,539. A worker thread is allocated on the destination and invokes the appropriate vfiler context in step 635 to process the replication (e.g., mirroring) operation. The system, the worker thread may identify the appropriate destination vfiler by examining the mirror table 500. The worker thread then writes the replication data to, e.g., disk within the vfiler context in step 640. The procedure 600 then completes in step 645.

One noted advantage of the present invention is that it enables an administrator to view data at two levels of granularity, namely at a per vfiler level and/or at a per physical storage system level. Thus, for example, an administrator may configure a storage system to mirror all data to a physical storage system regardless of the vfilers owning particular data, i.e., a conventional mirroring relationship. Alternately, by utilizing the present invention, an administrator may configure a mirroring application to perform mirroring based on a per vfiler level, which enables transparent replication even after migration of a vfiler from one physical storage system to a second physical storage system. Furthermore, by identifying those data containers being replicated between vfilers, an administrator may perform better quality load balancing and/or other administrative tasks to the vfilers.

The foregoing description has been directed to specific embodiments of this invention. It will be apparent, however, that other variations and modifications may be made to the described embodiments, with the attainment of some or all of their advantages. Furthermore, it should be noted that while the term mirroring has been utilized, it should be construed to cover any replication techniques. Therefore, it is the object of the appended claims to cover all such variations and modifications as come within the true spirit and scope of the invention.

What is claimed is:

1. A method for data replication in a computer system, the method comprising:
  establishing a data replication relationship from a source virtual server to a destination virtual server, the source virtual server executing on the computer system and the destination virtual server executing on the computer system;
  maintaining a mirror table associated with the data replication relationship, the mirror table having a first entry identifying the source virtual server and a second entry identifying the destination virtual server;
  performing a data transfer as part of the replication relationship from the source virtual server to the destination virtual server; and
  storing the transferred data in the destination virtual server.

2. The method of claim 1, further comprising:
  having a mirroring relationship as the data replication relationship.

3. The method of claim 1 further comprising:
  migrating the destination virtual server from a first physical system of the computer system to a second physical system of the computer system.

4. The method of claim 3 further comprising:
  updating a third entry in the mirror table to identify a current location of the destination virtual server.

5. The method of claim 4, further comprising:
  indicating the current location of the destination virtual server as a second physical system of the computer system hosting the destination virtual server.

6. The method of claim 1, further comprising:
  identifying a worker thread on the destination virtual server to store the transferred data;
  identifying a destination virtual server context data structure; and
  invoking, by the identified worker thread, the identified virtual server context data structure to write the transferred data to a persistent storage device of the computer system.

7. The method of claim 6, further comprising:
  examining a selected entry in the mirror table to identify the destination virtual server context data structure.

8. The method of claim 1, further comprising:
  identifying a destination virtual server context data structure associated with the data replication relationship by a selected entry in the mirror table, the destination virtual server context data structure identifying a configuration information of the destination virtual server.

9. The method of claim 1, further comprising:
  viewing data served by a physical system hosting the destination virtual server on a per virtual server basis.

10. The method of claim 1, further comprising:
  viewing all data served by one or more virtual servers executing on a physical system of the computer system hosting the destination virtual server.

11. The method of claim 1 further comprising:
  migrating the source virtual server from a first physical system of the computer system to a second physical system of the computer system.

12. The method of claim 11 further comprising:
  updating the mirror table to identify a current location of the source virtual server.

13. A system configured to enable data replication, comprising:
  a source virtual server executing on a first physical computer, the source virtual server associated with a data container;
  a destination virtual server executing on a second physical computer, the destination virtual server having a data replication relationship with the source virtual server;
  a mirror table associated with a data replication process, the mirror table having an entry associated with the data replication relationship between the source and destination virtual servers; and a data replication program configured to identify locations of the source and destination virtual servers when performing a data replication operation.

14. The system of claim 13, further comprising:
a mirroring relationship used as the data replication relationship.

15. The system of claim 13, further comprising:
the data replication program has a plurality of worker threads.

16. The system of claim 15, further comprising:
a source virtual server context data structure invoked by one of the worker threads in response to initiating the data replication operation.

17. The system of claim 15, further comprising:
a destination virtual server context data structure invoked by one of the worker threads to write data during the data replication operation.

18. The system of claim 13, further comprising:
the mirror table has entries to identify the source virtual server, a path associated with the data container replicated by the source virtual server, an identifier of the destination virtual server and a path associated with the replicated data container stored at the destination virtual server.

19. The system of claim 13, further comprising:
the data container is a volume.

20. The system of claim 13, further comprising:
the source virtual server migrates to a third physical computer of the computer system and the mirror table entry is updated in response to the migration.

21. A computer system for data replication, comprising:
means for establishing a data replication relationship from a source virtual server to a destination virtual server, the source virtual server executing on the computer system and the destination virtual server executing on the computer system;
means for maintaining a mirror table associated with the data replication relationship, the mirror table having an entry identifying the source virtual server and an entry identifying the destination virtual server;
means for performing a data transfer as part of the replication relationship from the source virtual server to the destination virtual server; and
means for storing the transferred data in the destination virtual server.

22. A non-transitory computer readable hardware medium for transparent data replication on a computer system, the non-transitory computer readable medium including program instructions for:
establishing a data replication relationship from a source virtual server to a destination virtual server, the source virtual server executing on the computer system and the destination virtual server executing on the computer system;
maintaining a mirror table associated with the data replication relationship, the mirror table having a first entry identifying the source virtual server and a second entry identifying the destination virtual server;
performing a data transfer as part of the replication relationship from the source virtual server to the destination virtual server; and
storing the transferred data in the destination virtual.

23. A method for operating a data storage system, comprising:
establishing a source virtual server and a destination virtual server, the destination virtual server to hold a mirror copy of the source virtual server, the source virtual server and the destination virtual server established on a physical system of the data storage system;
maintaining a mirror table having a first entry identifying the source virtual server and a second entry identifying the destination virtual server;
performing a data transfer from the source virtual server to the destination virtual server; and
storing the transferred data in the destination virtual server.

24. The method as in claim 23, further comprising:
migrating the source virtual server to a second physical system while maintaining the mirror of the source virtual server on the destination virtual server.

25. The method of claim 23, further comprising:
migrating the destination virtual server to a second physical system of the data storage system, and maintaining the mirror copy on the destination virtual server.

26. The method of claim 25, further comprising:
updating the mirror table to identify a current location of the destination virtual server.

27. A method for operating a data storage system, comprising:
establishing a source virtual server on a first physical system of the data storage system and establishing a destination virtual server on a second physical system of the data storage system, the destination virtual server to hold a mirror copy of the source virtual server;
maintaining a mirror table having a first entry identifying the source virtual server and a second entry identifying the destination virtual server;
performing a data transfer from the source virtual server to the destination virtual server; and
storing the transferred data in the destination virtual server.

28. The method as in claim 27, further comprising:
migrating the source virtual server to a third physical system of the data storage system while maintaining the mirror of the source virtual server on the destination virtual server.

29. The method of claim 27, further comprising:
migrating the destination virtual server to a third physical system of the data storage system, and maintaining the mirror copy on the destination virtual server.

30. The method of claim 29, further comprising:
updating the mirror table to identify a current location of the destination virtual server.

31. A data storage system apparatus, comprising:
a source virtual server and a destination virtual server, the destination virtual server to hold a mirror copy of the source virtual server, the source virtual server and the destination virtual server maintained on a physical system of the data storage system;
a mirror table having a first entry identifying the source virtual server and a second entry identifying the destination virtual server;
a process to perform a data transfer from the source virtual server to the destination virtual server; and
the transferred data stored in the destination virtual server.

32. The apparatus as in claim 31, further comprising:
a second physical system of the data storage system, the source virtual server migrated to the second physical system and the destination virtual server maintaining the mirror copy of the source virtual server.

33. The apparatus of claim 32, further comprising:
the mirror table updated to identify a current location of the source virtual server.

34. The apparatus as in claim 31, further comprising:
a third physical system of the data storage system, the destination virtual server migrated to the third physical system and the destination virtual server maintaining the mirror copy.

35. The apparatus of claim 34, further comprising:
the mirror table updated to identify a current location of the destination virtual server.

36. A data storage system apparatus, comprising:
a source virtual server maintained on a first physical system of the data storage system and a destination virtual server maintained on a second physical system of the data storage system, the destination virtual server to hold a mirror copy of the source virtual server;
a mirror table having a first entry identifying the source virtual server and a second entry identifying the destination virtual server;
a process to perform a data transfer from the source virtual server to the destination virtual server; and
the transferred data stored in the destination virtual server.

37. The apparatus as in claim 36, further comprising:
a third physical system of the data storage system, the source virtual server migrated to the third physical system and the destination virtual server maintaining the mirror copy of the source virtual server.

38. The apparatus of claim 37, further comprising:
the mirror table updated to identify a current location of the source virtual server.

39. The apparatus as in claim 36, further comprising:
a third physical system of the data storage system, the destination virtual server migrated to the third physical system and the destination virtual server maintaining the mirror copy of the source virtual server.

40. The apparatus of claim 39, further comprising:
the mirror table updated to identify a current location of the destination virtual server.

* * * * *

UNITED STATES PATENT AND TRADEMARK OFFICE
CERTIFICATE OF CORRECTION

| | | |
|---|---|---|
| PATENT NO. | : 7,925,749 B1 | Page 1 of 1 |
| APPLICATION NO. | : 11/739239 | |
| DATED | : April 12, 2011 | |
| INVENTOR(S) | : Dong Lin et al. | |

It is certified that error appears in the above-identified patent and that said Letters Patent is hereby corrected as shown below:

In Col. 3, line 50 should read:
　　system. It will be apparent to those is skilled in the art that In Col. 13, line 48 should read:
　　non-transitory computer readable hardware medium including pro- In Col. 13, line 62 should read:
　　storing the transferred data in the destination virtual server.

Signed and Sealed this
Eighteenth Day of September, 2012

David J. Kappos
*Director of the United States Patent and Trademark Office*